(12) United States Patent
Lin et al.

(10) Patent No.: US 9,170,386 B2
(45) Date of Patent: Oct. 27, 2015

(54) OPTO-ELECTRONIC DEVICE ASSEMBLY

(71) Applicant: HON HAI PRECISION INDUSTRY CO., LTD., New Taipei (TW)

(72) Inventors: Yuan-Chieh Lin, Lake Forest, CA (US); Jun-Bin Huang, Eastvale, CA (US); Terrance F. Little, Fullerton, CA (US); Gang Paul Chen, Walnut, CA (US); Jie Zheng, Rowland-Heights, CA (US); An-Jen Yang, Irvine, CA (US); Jim Zhao, Irvine, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 228 days.

(21) Appl. No.: 13/897,610

(22) Filed: May 20, 2013

(65) Prior Publication Data
US 2014/0341513 A1 Nov. 20, 2014

(51) Int. Cl.
G02B 6/42 (2006.01)
G02B 6/43 (2006.01)

(52) U.S. Cl.
CPC ............ *G02B 6/4272* (2013.01); *G02B 6/4284* (2013.01); *G02B 6/4292* (2013.01); *G02B 6/43* (2013.01)

(58) Field of Classification Search
None
See application file for complete search history.

(56) References Cited

U.S. PATENT DOCUMENTS

| 5,895,276 | A | 4/1999 | Rothenberger |
| 6,042,386 | A | 3/2000 | Cohen |
| 6,343,171 | B1 | 1/2002 | Yoshimura |
| 7,209,621 | B2 | 4/2007 | Glebov |
| 7,421,858 | B2 | 9/2008 | Fukuzawa |
| 7,499,616 | B2 | 3/2009 | Aronson |
| 8,035,973 | B2 | 10/2011 | McColloch |
| 8,331,752 | B2 | 12/2012 | Biribuze et al. |
| 8,348,516 | B2 | 1/2013 | Roth |
| 8,412,052 | B2 | 4/2013 | Mohammed |
| 8,669,515 | B2 * | 3/2014 | Ishigami et al. ............... 250/239 |
| 2008/0310799 | A1 | 12/2008 | Jacobowitz |
| 2012/0082420 | A1 * | 4/2012 | Aoki ............................. 385/88 |
| 2013/0108224 | A1 | 5/2013 | Ishigami |
| 2014/0037254 | A1 * | 2/2014 | Wang et al. ..................... 385/94 |

* cited by examiner

Primary Examiner — Uyen Chau N Le
Assistant Examiner — John M Bedtelyon
(74) Attorney, Agent, or Firm — Ming Chieh Chang; Wei Te Chung

(57) ABSTRACT

An AOC assembly comprising two printed circuit boards (PCB) (63), a board holder (61) and two heat conducting covers (64) with integrated head spreader. Each of the two PC boards has a lower edge (632) extending in a longitudinal direction with circuit pads on opposite sides of PCB thereof. The board holder has two opposite vertical datum faces with two of said PC boards respectively positioned thereon. The two heat conducting covers oppositely fixed to the holder in a transverse direction perpendicular to the PC boards. When assembled, the integrated heat spreader of heat conducting shell would dissipate heat from the active electronic components on the PCB.

18 Claims, 23 Drawing Sheets

OPTO-ELECTRONIC DEVICE ASSEMBLY

CROSS-REFERENCE TO RELATED APPLICATIONS

This patent application is related to a pending U.S. patent application Ser. No. 13/858,932, filed on Apr. 8, 2013, and entitled "OPTO-ELECTRONIC DEVICE ASSEMBLY", which is assigned to the same assignee with this application.

BACKGROUND OF THE INVENTION

1. Field of the Invention

The present invention relates to opto-electronic (OE) device assemblies, and more specifically to integrating multiple OE modules with waveguide, e.g., Fiber or Polymer Waveguide (PWG), as an OE sub-assembly to further reduce user's installation and testing costs.

2. Description of Related Art

Most computer and communication networks today rely on copper wire to transmit data between nodes in the network. Since the data transmitted over the copper wire and the data processed within the nodes are both represented in the form of electrical signals, the transfer of data at the node-copper wire interface is straight forward. Other than perhaps level shifts and signal amplification, no other signal processing is required for data transmitted over the copper wire to be decoded by the node. The drawback with using copper wire is its relatively narrower bandwidth. Copper's ability to transmit data is significantly limited compared to other mediums, such as fiber optics. Accordingly much of the computer and communication networks built today, including the Internet, are using fiber optic cable instead of copper wire.

With fiber optic cable, data is transmitted using light wave, rather than electrical signals. For example, a logical one (1) may be represented by a light pulse of a specific duration and a logical zero (0) may be represented by the absence of a light pulse for the same duration. In addition, it is also possible to transmit at the same time multiple colors of light over a single strand of optic fiber, with each color of light representing a distinct data stream. Since light is attenuated less in fiber than electrons traveling through copper, and multiple data streams can be transmitted at one time, the bandwidth of optic fiber is significantly greater than copper.

While fiber optic data transmission has proven very efficient, substantial problems have been encountered when applying these light signals to process data. Transferred data is typically stored in various locations before, during and after it is processed by a computer. Since there is currently no efficient technique to "store" these light packets of data, networks will likely continue to use fiber optics for transmitting data between nodes and silicon chips to process the data within the nodes for the foreseeable future. Building such networks requires opto-electronic transceivers, which connect optical transmission devices to electronic computing devices through devices that transform optical signals to electronic signals, and vice-versa.

Ideally, such opto-electronic transceivers should provide secured and reliable connections between the various devices and should be compact in size. Secured connections ensure that the individual devices do not disconnect and therefore cause a failure in the opto-electronic transformation process. Compactly sized transceiver modules allow a higher density of optical cables to be attached to an electronic printed circuit board, thereby increasing the bandwidth available to the computing system.

While the transceiver design adequately ensures a secure connection between optical and electronic devices, assembly of its individual sub-assemblies is mechanically complex.

In view of the foregoing, a simple and compact opto-electronic transceiver capable of providing secure connections between optical and electronic devices would be desirable. Specifically, this instant invention is to replace the current ceramic substrate which is implanted with 56 Duece modules thereon.

SUMMARY OF THE INVENTION

Accordingly, an object of the present invention is to provide a new modular active optical interconnect system for replacing the traditional ceramic substrate implanted with a plurality of OE modules. The modular active optical interconnect system includes a simple and compact flat-top heat conducting shell to receive water-cooling manifold and a plastic molded PCB holder having enhance features in contacts that will improve the overall cooling efficiency in the system.

In brief, technically speaking the prior art is to install a plurality of OE module in a LGA socket which is for electrical interface. After the OE module converting the electrical signal into optical signal and vice versa, an optical connector with waveguide is to attach to the optical interface of OE module for optical signal transmission or receiving. Due to the active components of OE module which generates heat, a heat sink/spreader is required for heat dissipation. In the field, it is troublesome to install all those components, inspection, testing and field service. The invention is to put all those troublesome behind by organizing all those components in an Active Optical Cable (AOC) package. The user just plugs in the AOC into socket or unplug just like an ordinary cable assembly. An organizer is to allow a plurality of AOC to align with the socket to form a compact package in a dense area. It makes easy installation and field serviceable.

A preferred advantage of the present invention is to provide an AOC plug comprising one or more PC boards each equipped with OE components and having a lower edge extending in a longitudinal direction with circuit pads on opposite side thereof; a board holder having two opposite vertical datum faces with two of said PC boards respectively positioned thereon; two heat conducting covers oppositely fixed to said holder in a transverse direction perpendicular to the PC boards. The integrated heat spreader of heat conducting shell would dissipate heat from the active electronic components on the PCB after assembly.

Other objects, advantages and novel features of the invention will become more apparent from the following detailed description when taken in conjunction with the accompanying drawings.

DETAILED DESCRIPTION OF THE PREFERRED EMBODIMENT

Figure 1:
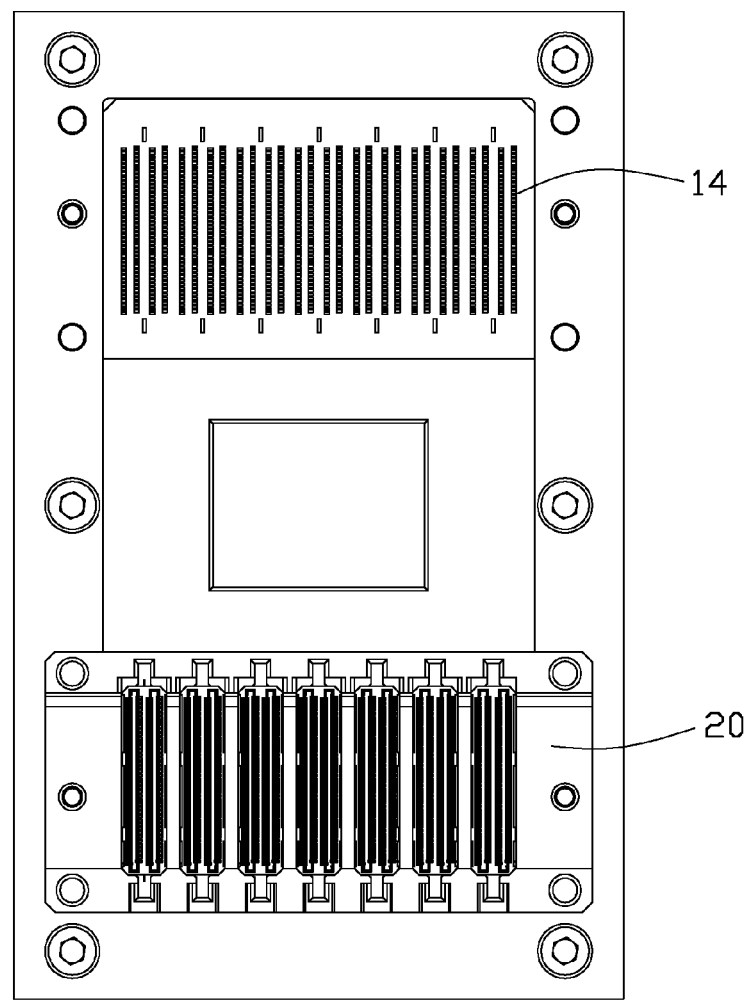
FIG. 1 is a top view showing the substrate of the present preferred embodiment of the instant invention wherein one side of the connectors are removed to show the area is same as that arranged for the conventional 4×7 OE module socket of the prior art.
Figure 2:
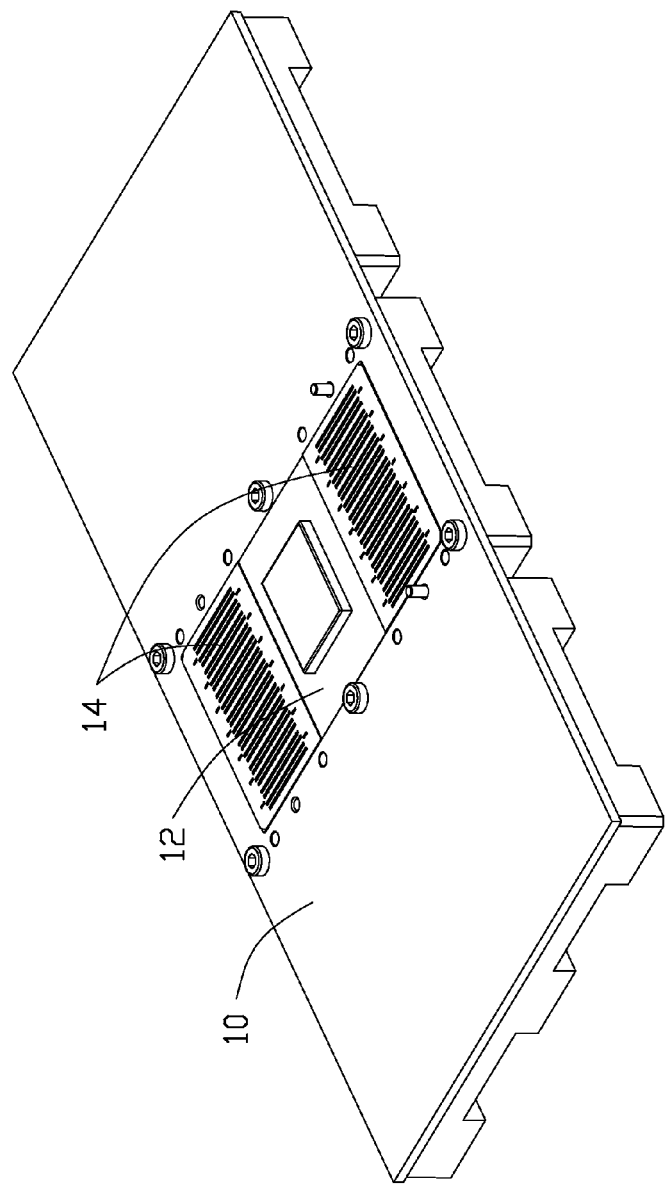
FIG. 2 is a perspective view of a frame with therein the substrate of the FIG. 1 while without the organizer and the connectors attached to the ceramic substrate.
Figure 3:
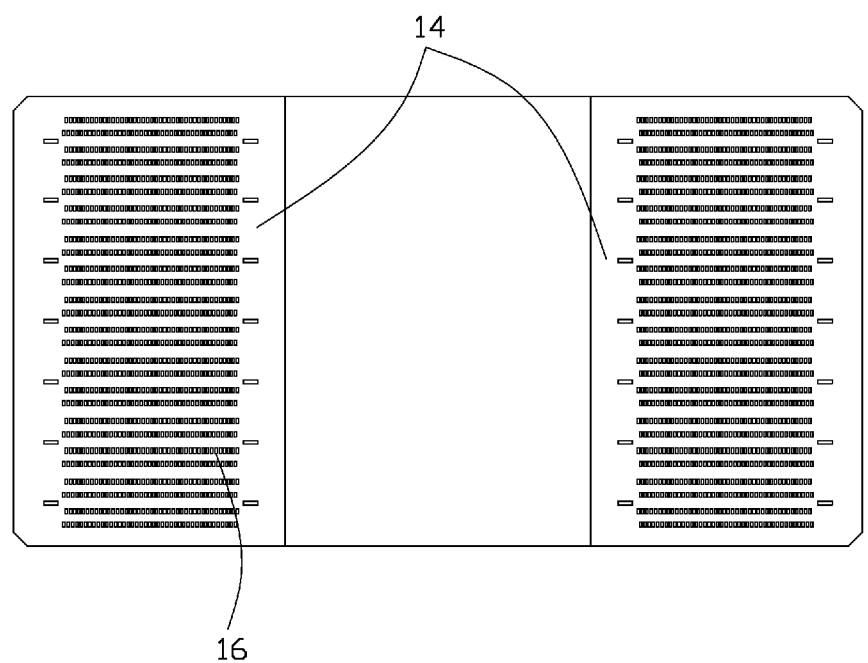
FIG. 3 is a top view of the substrate of FIG. 1 without the organizer and the connectors attached thereto.
Figure 4:
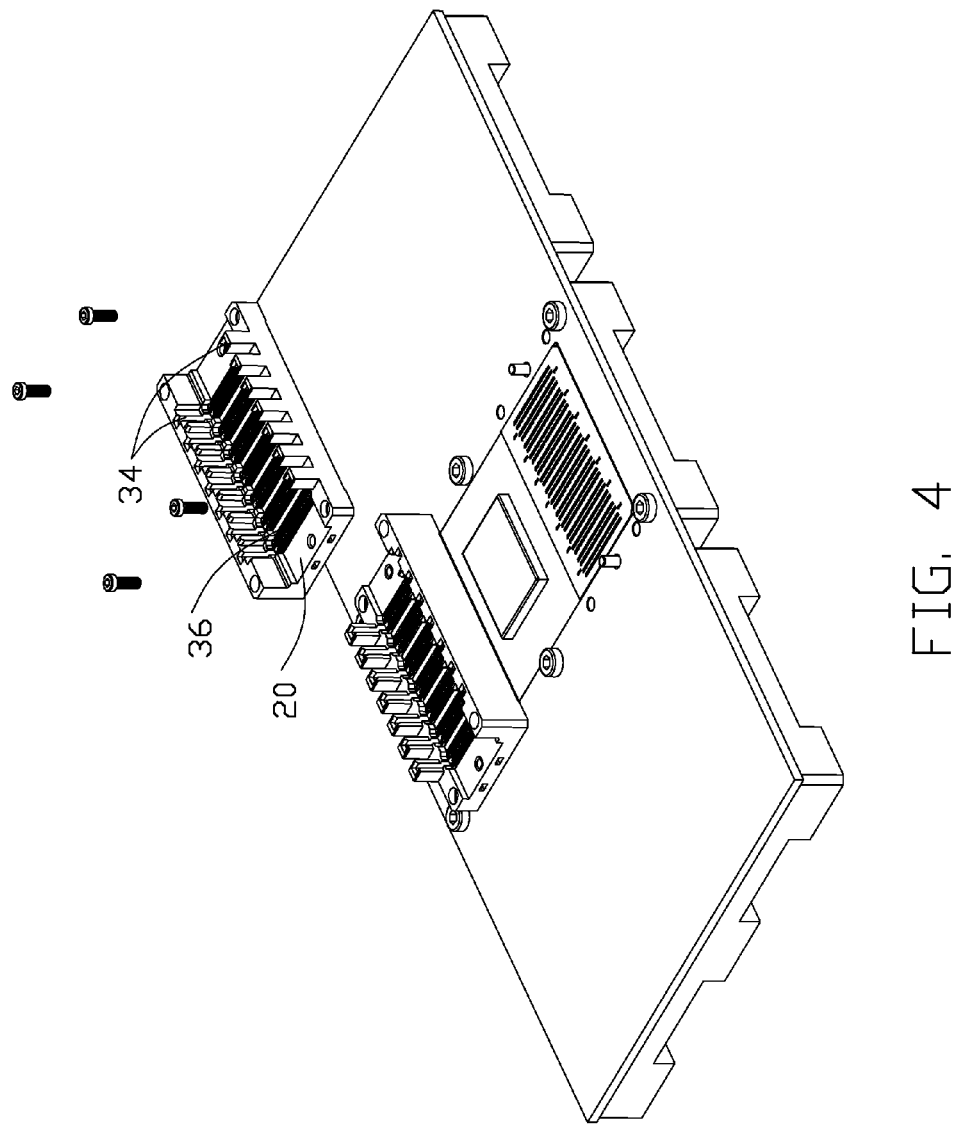
FIG. 4 is a partial perspective view of FIG. 2 to show how the organizer is ready to be assembled to the base.
Figure 5:
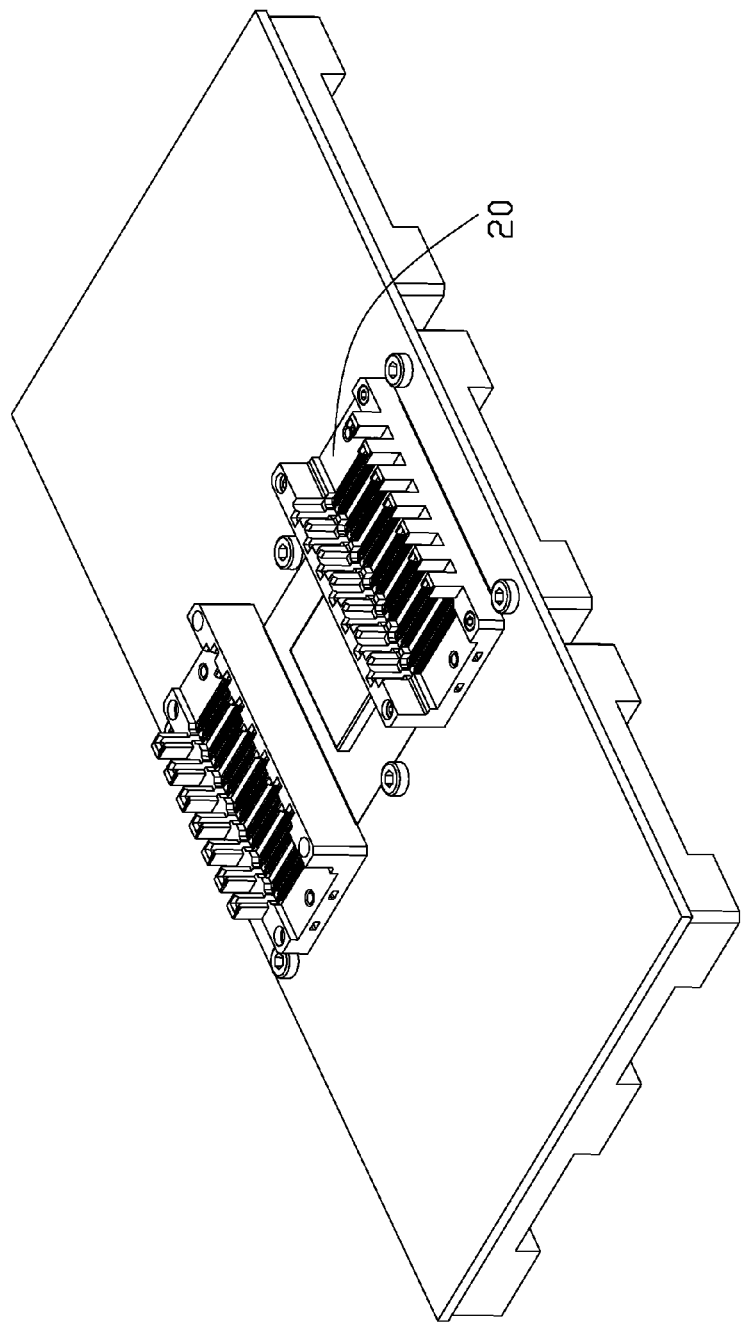
FIG. 5 is a partial perspective view of FIG. 4 to show the organizer is assembled to the base so as to have the associated connectors electrically and mechanically connected to the ceramic substrate.
Figure 6:
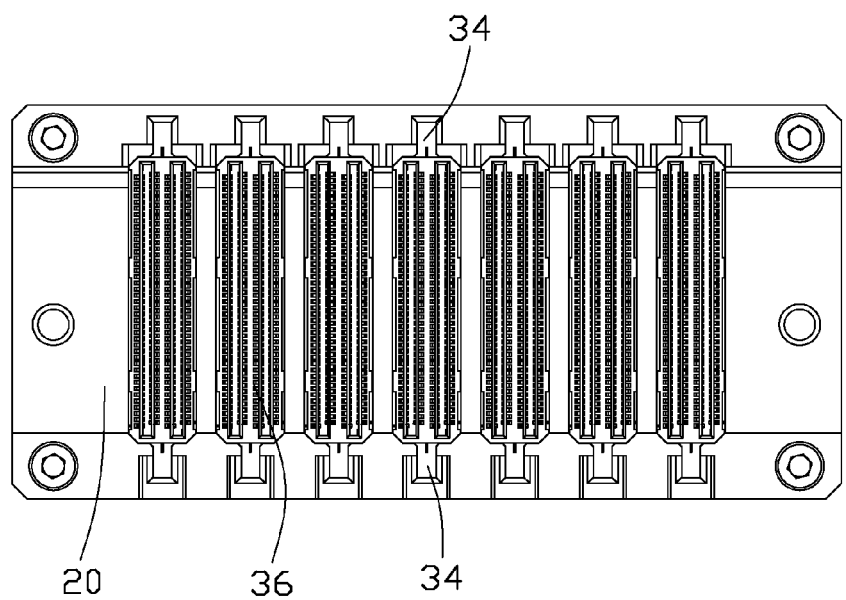
FIG. 6 is a top view to show the organizer with the connectors therein.
Figure 7:
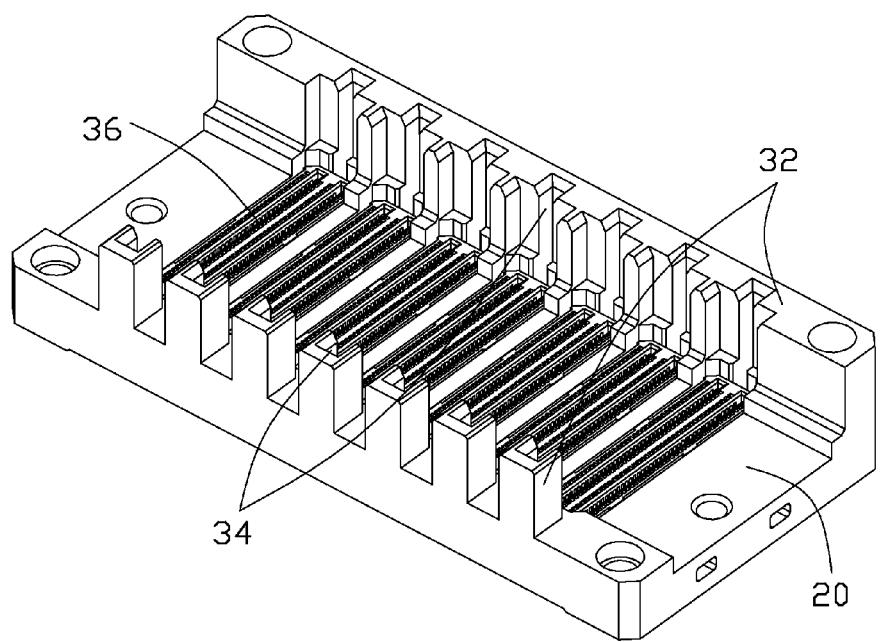
FIG. 7 is a perspective view to show the organizer with the connectors therein.
Figure 8:
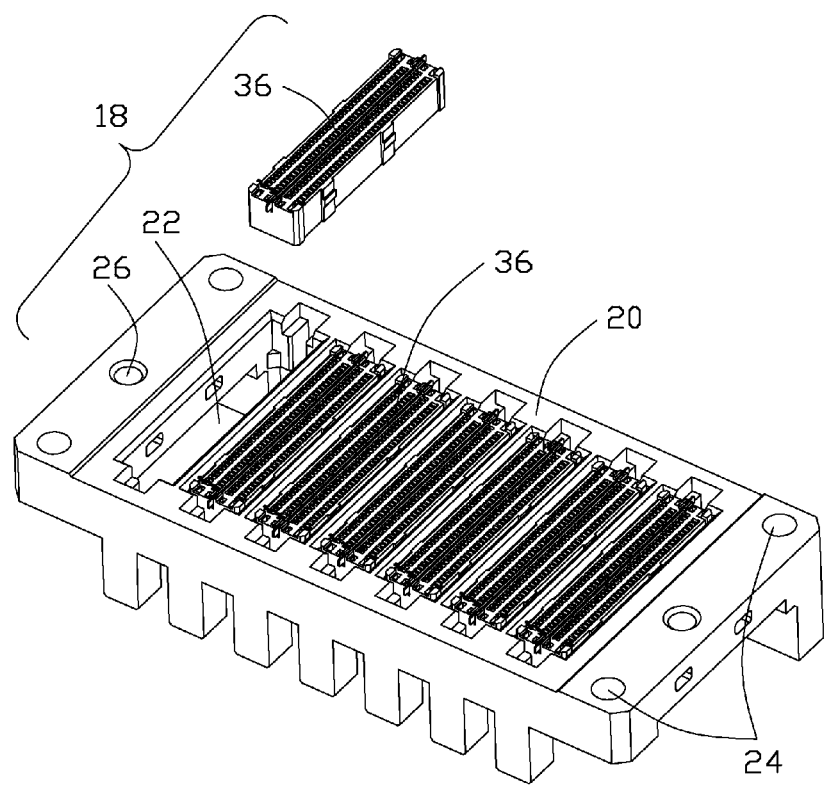
FIG. 8 is an upside down perspective view to show the assembling direction of the connector with regard to the organizer.
Figure 9:
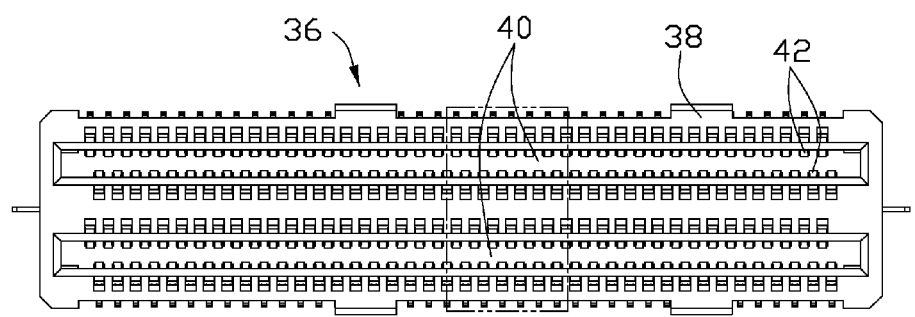
FIG. 9 is a top view of the connector to show two receiving slots therein.
Figure 10:
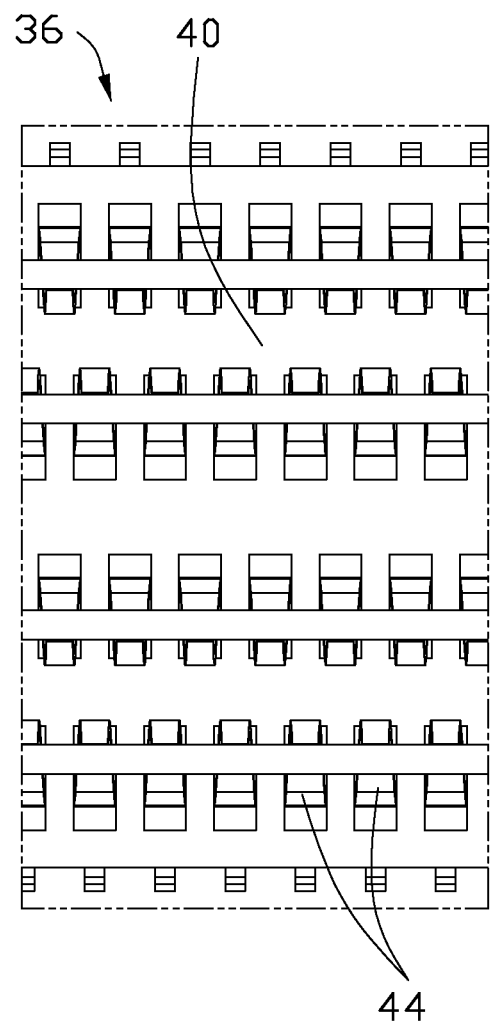
FIG. 10 is an enlarged partial view of FIG. 9 to show the staggered arrangement of the contacts by two sides of the corresponding receiving slot.
Figure 11:
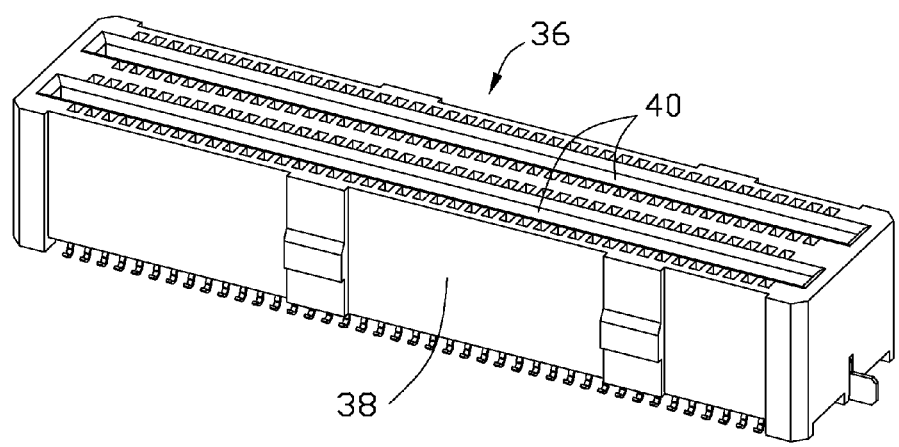
FIG. 11 is a perspective view of the connector.
Figure 12:
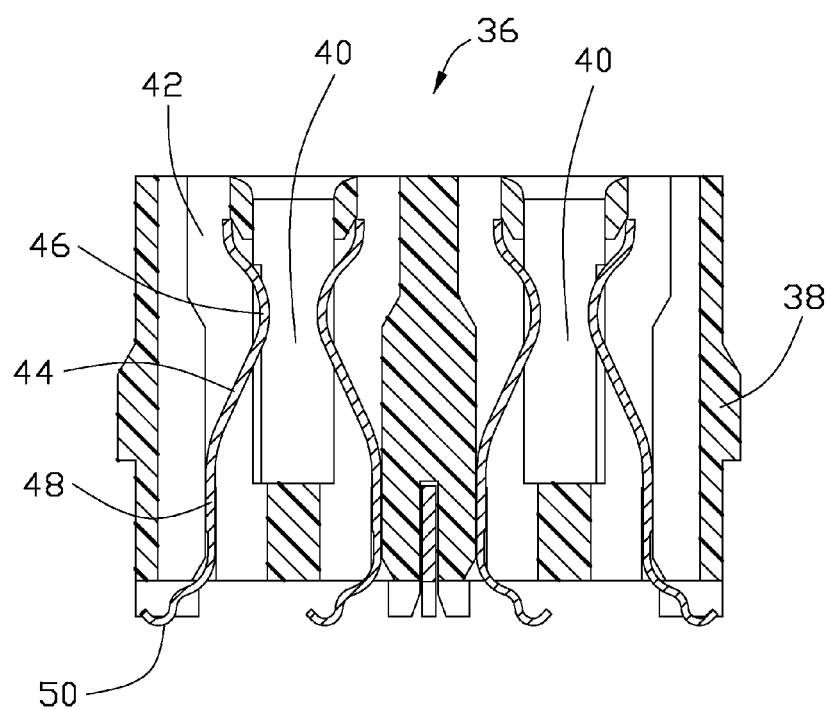
FIG. 12 is an illustrative elevational view to show the LGA type and paddle card type contact interfaces.
Figure 13:
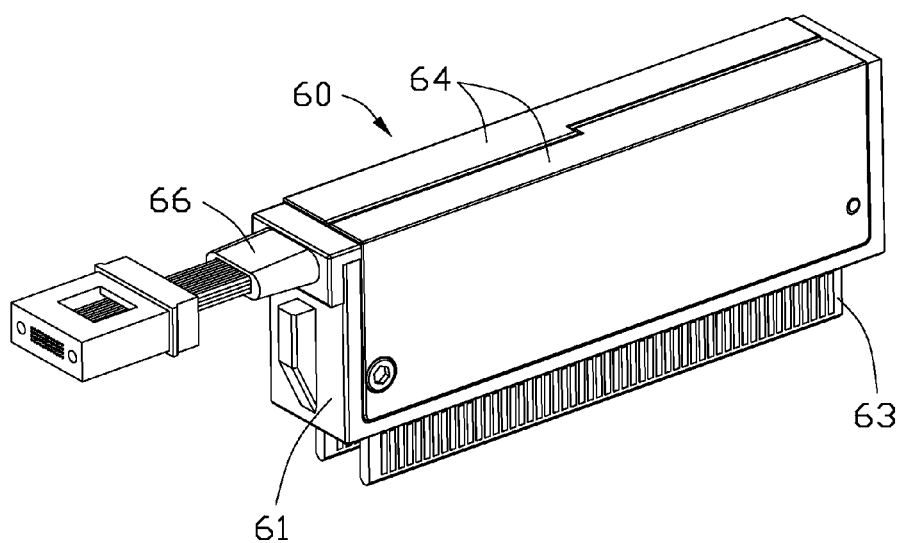
FIG. 13 is a perspective view to show the AOC module.
Figure 14:
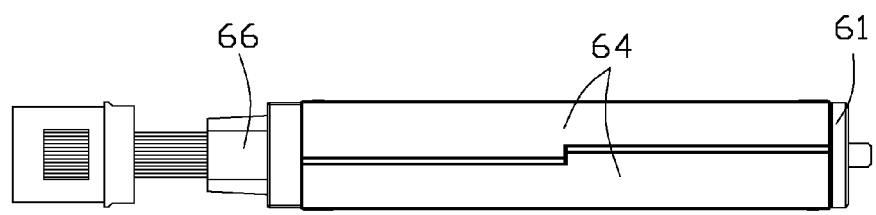
FIG. 14 is a top view to show the AOC module.
Figure 15:
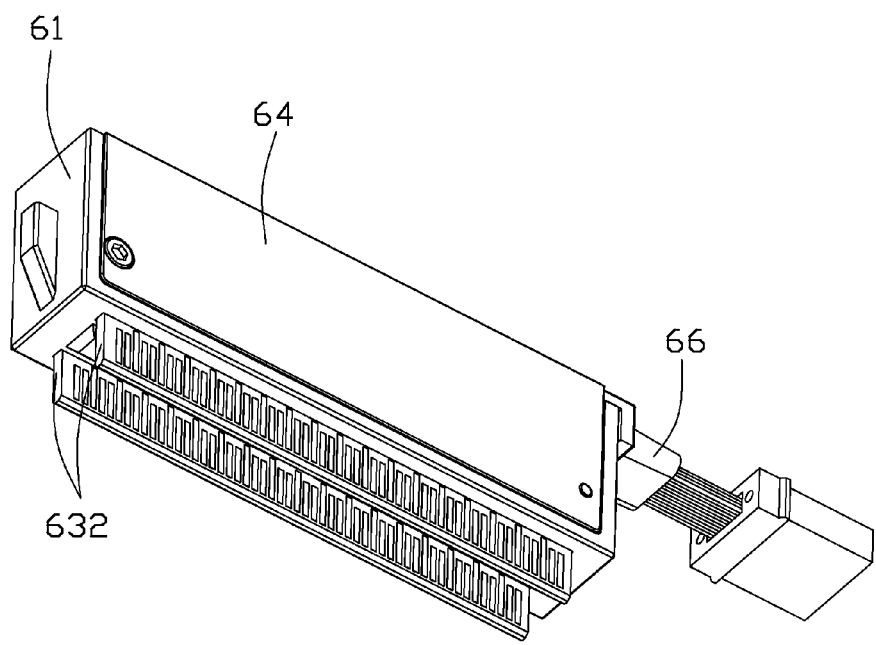
FIG. 15 is another perspective view to show the AOC module of FIG. 13.

Reference will now be made in detail to the preferred embodiment of the present invention.

Referring FIGS. 1-23, an aluminum frame 10 defines a ceramic substrate receiving area to receive a ceramic substrate 12 therein. The ceramic substrate 12 defines two connector areas 14, on two opposite ends in a longitudinal direction, forming LGA (Land Grid Array) pads 16 thereon. A modular SLC (Surface Laminate Circuit) interconnect system 18 is fastened to the aluminum frame 10 around each of the connector areas 14, and includes an aluminum organizer 20 defining a plurality of elongated cavities 22 in a transverse direction perpendicular to the longitudinal direction while each of the cavities 22 extends along the longitudinal direction. The aluminum organizer 20 defines a plurality of fastening holes 24 and a plurality of locating holes 26 to receive corresponding screws 28 and dowel pins 30 for locating and fastening the organizer 20 upon the aluminum frame 10. The organizer 20 further includes a pair of tower structures 32 on two lateral sides in the transverse direction to commonly defines plural pairs of vertical guide channels 34. A plurality of card edge connectors (receptacle) 36 are respectively disposed in the corresponding cavities 22. The cavity 22 is configured to allow the connector 36 to be assembled thereinto in only an upper direction.

Each connector 36 includes an insulative housing 38 defines a pair of card receiving slots 40 in the transverse direction while each card receiving slot 40 extends along the longitudinal direction. A plurality of passageways 42 are formed in the housing 38 and by two sides of the corresponding card receiving slot 40 in a staggered manner along the transverse direction. A plurality of contacts 44 are disposed in the corresponding passageways 42, respectively. Each contact 44 includes an upper contacting section 46 extending into the corresponding card receiving slot 40, a middle retaining section 48 retained to the housing 38, and a lower tail section 50 for contacting the corresponding LGA pad 16 wherein in a side view the upper contacting sections 46 of the contacts 44 which share the same card receiving slot 40, are symmetrically arranged with each other while the lower tail sections 50 of the contacts 44 sharing the same card receiving slot 40 are arranged same with each other but commonly symmetrically arranged with the lower tail sections of the contacts sharing the other card receiving slot 40. It is noted that the distance or pitch between the pair of card receiving slots 40 is 3.0 mm for compliance with the traditional SLC to SLC arrangement, and the pitch between the adjacent two contacts on the same side is 0.6 mm.

A plurality of SLC or AOC modules 60 (AOC plug) are assembled to the organizer 20 and the associated connectors 36, respectively. Each SLC module 60 includes two opposite SLC or AOC assemblies 62, an insulating board holder 61 sandwiched by the opposite AOC assemblies 62 and a pair of heat conducting covers 64 closed to receiving the AOC assemblies 62, and an optical cable assembly 66.

Each of the SLC or AOC assemblies 62 comprises an SLC board 63 capable of transmission of twelve pairs Tx and twelve pairs Rx with 0.6 mm pitch thereof and equipped with a micro-controller, two OE glass lenses, a Tx IC chip, a Rx IC chip, a plurality of VCSEL and PD arrays (VCSEL and PD could be named OE components). The plurality of VCSEL and PD arrays are respectively coupled to the optical cable assembly 66 by the two OE glass lenses. Each of SLC boards 63 has a lower edge 632 extending in a longitudinal direction with circuit pads 636 on opposite side thereof.

The board holder 61 has a longitudinally extending bottom wall 610, two end walls 612 extending downwardly to connect to longitudinal ends of the bottom wall 610, two inner walls 614 protruding toward each other from inner sides of the two end walls 612 in the longitudinal direction, two longitudinal blocks 616 bumping out from outer sides of the two end walls 614 and an intermediate protrusion 611 upwardly extending from the bottom wall 610. The intermediate protrusion 611 has a scaled portion 615 jointly with the two inner walls 614 defining two opposite vertical datum faces with said SLC boards 63 respectively positioned thereon. The scaled portion 615 is spaced from the bottom wall 610 with a pair of cutaway 613 defined therebetween. The bottom wall 610 defines two long and narrow passageways 617 for receiving the SLC boards 63 respectively. When assembled, the intermediate protrusion 611 and the two inner walls 614 are sandwiched by the two SLC boards 63, the SLC boards 63 are longitudinally positioned between the two end walls 612 with the lower edges 632 extending downwardly through the long and narrow passageways 617.

Figure 16:
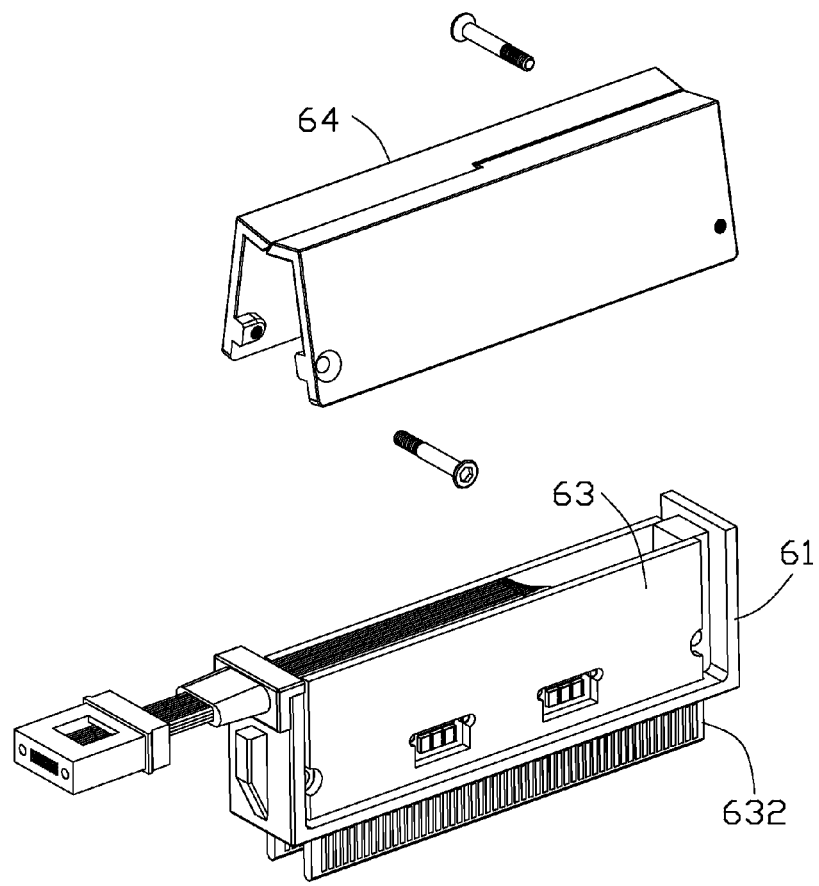
FIG. 16 is a partially exploded view of the AOC module of FIG. 13.
Figure 17:
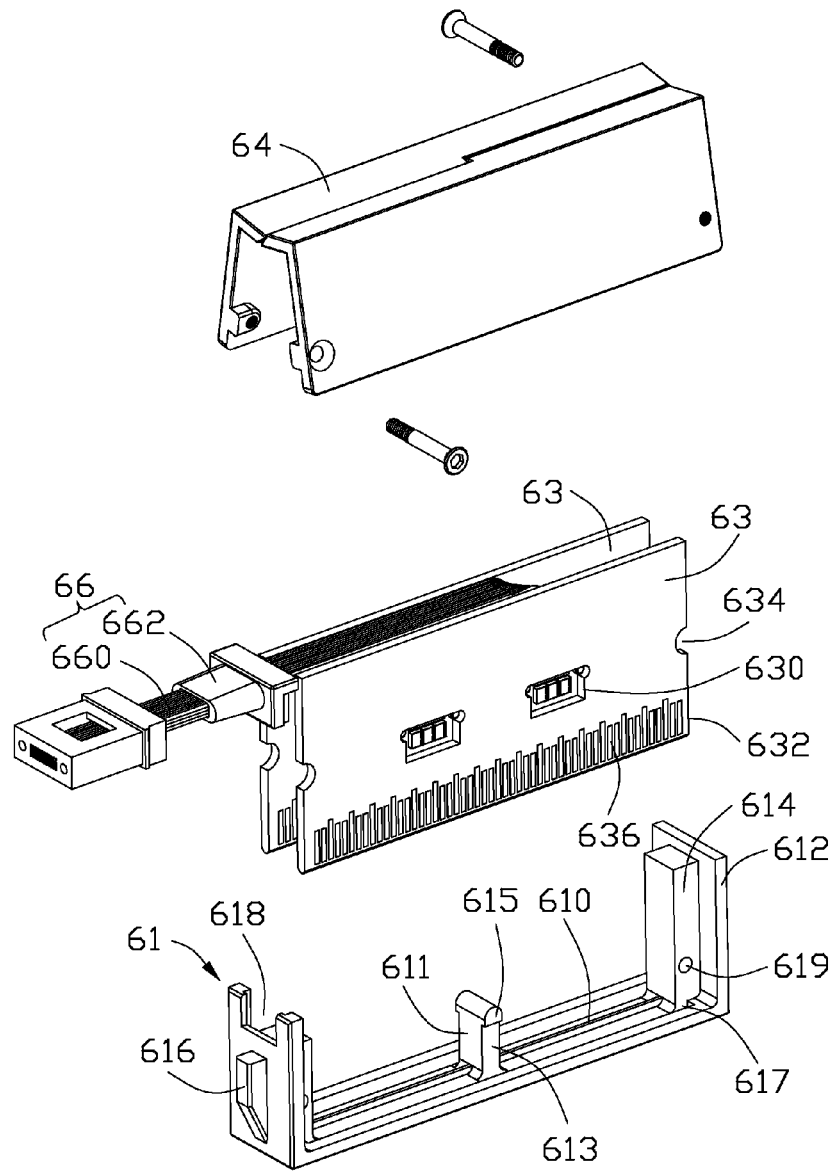
FIG. 17 is another partially exploded view of the AOC module of FIG. 13.
Figure 18:
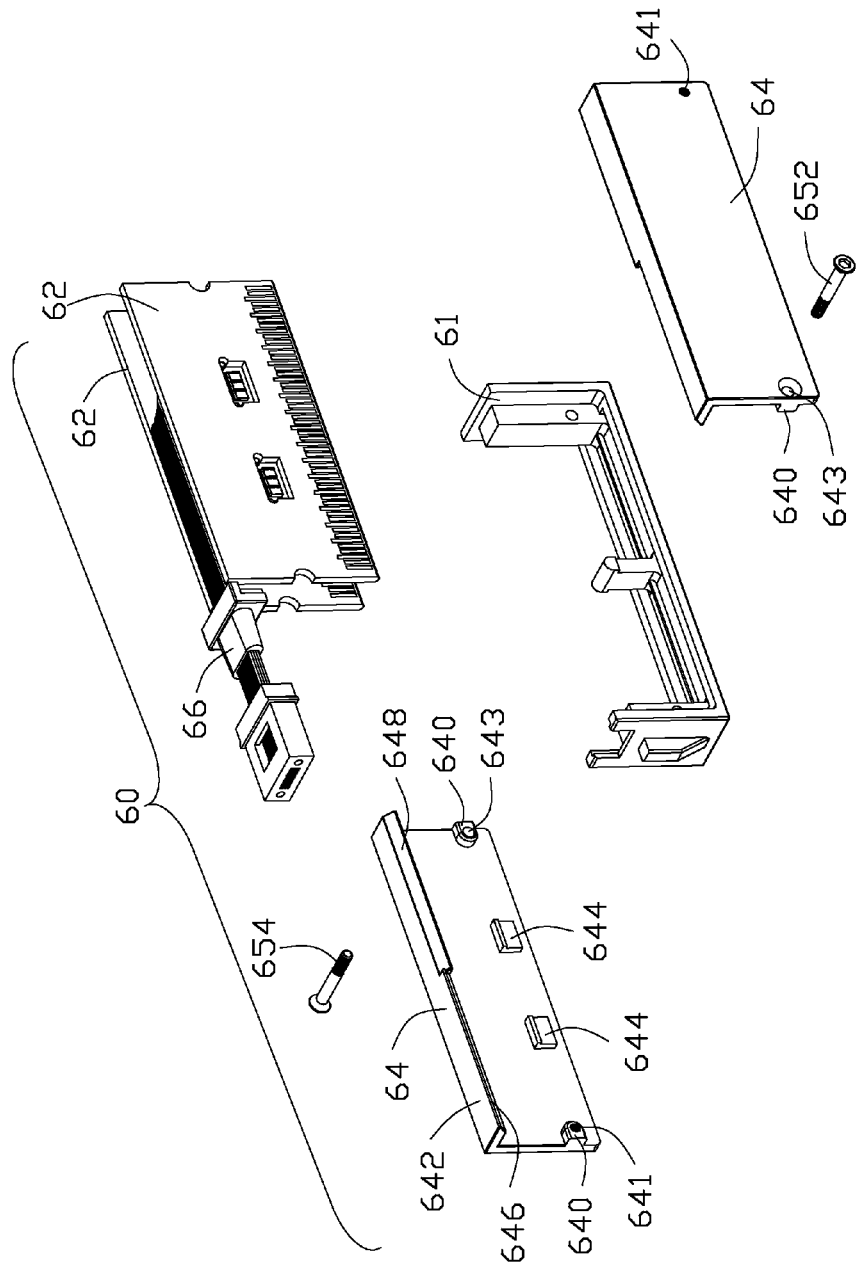
FIG. 18 is another partially exploded view of the AOC module of FIG. 13.
Figure 19:
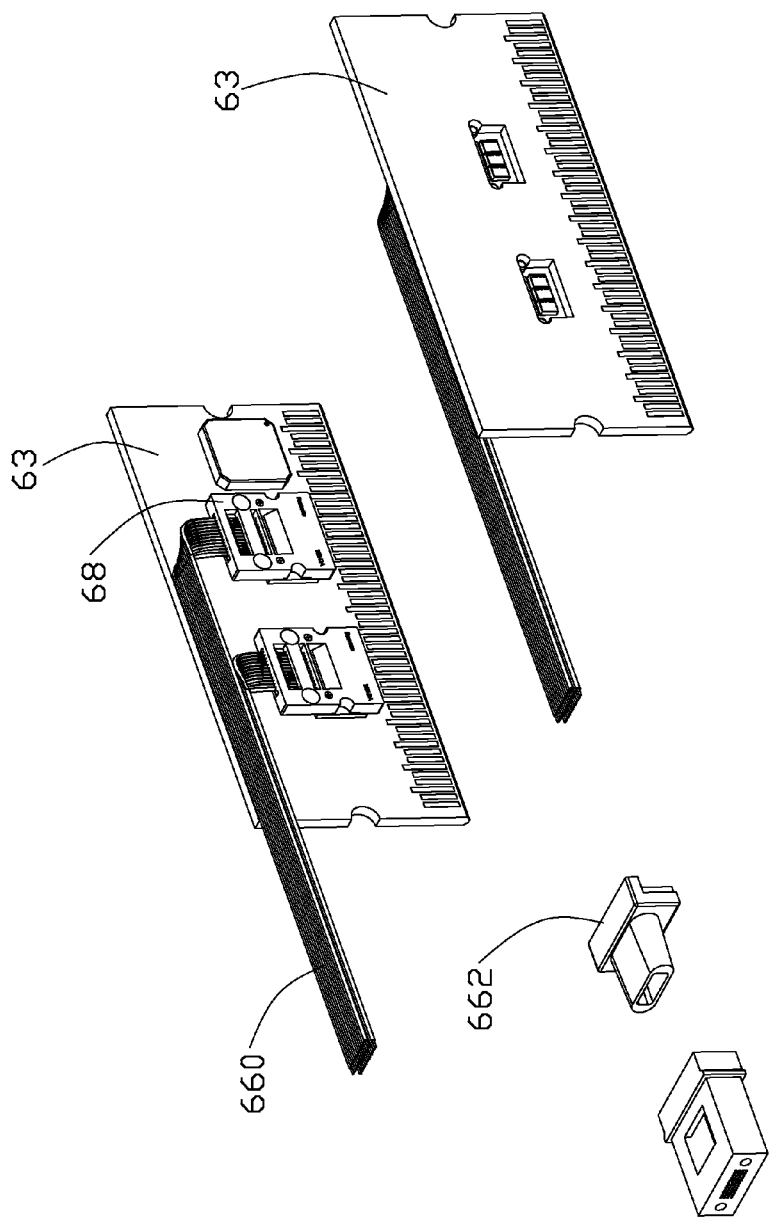
FIG. 19 is a partially exploded view of AOC module of FIG. 13 with two heat conducting covers and a board holder removed.
Figure 20:
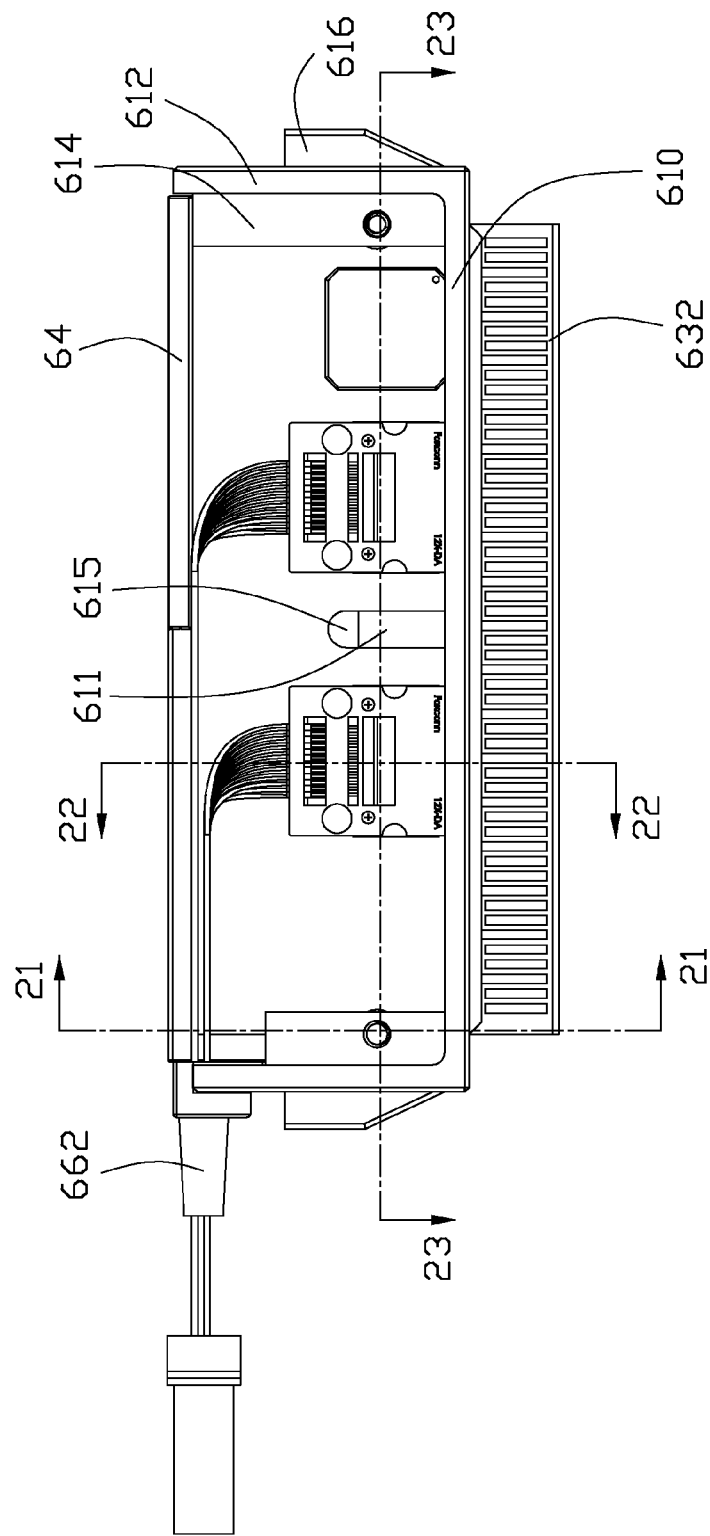
FIG. 20 is a side view the AOC module of FIG. 13 with one heat conducting cover and one PC board removed.
Figure 21:
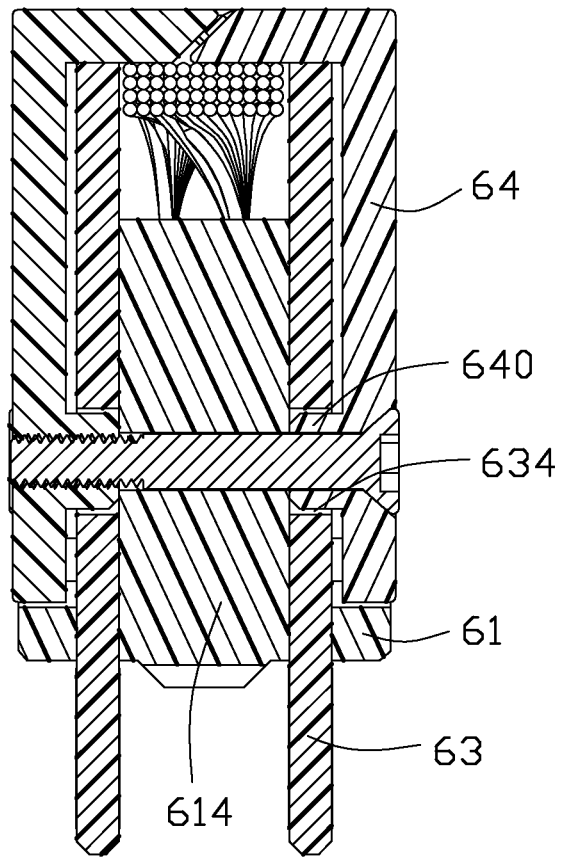
FIG. 21 is a cross section view of the AOC module of FIG. 20 taken alone the line 21-21.
Figure 22:
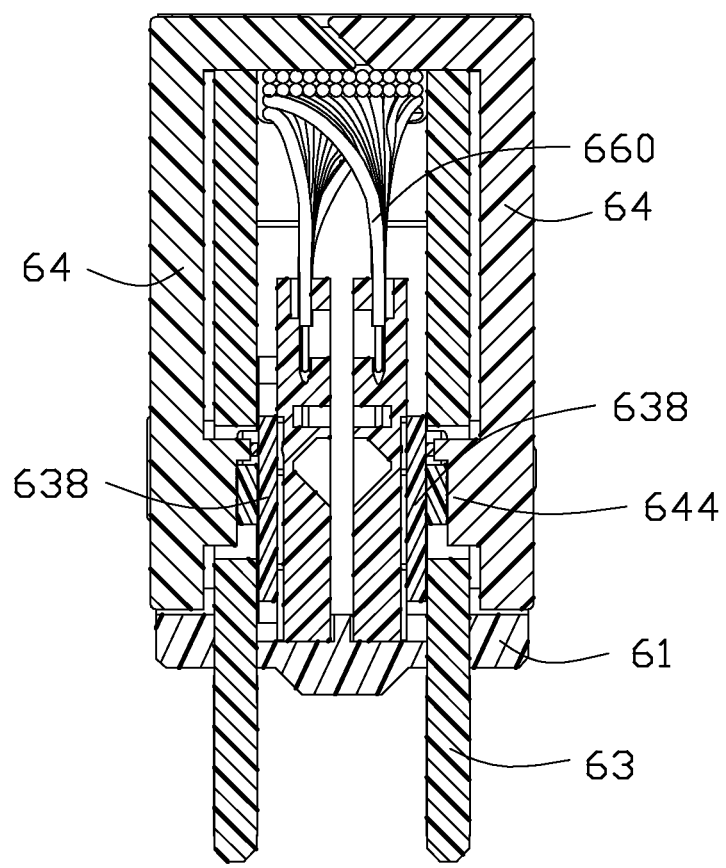
FIG. 22 is a cross section view of the AOC module of FIG. 20 taken alone the line 22-22.
Figure 23:
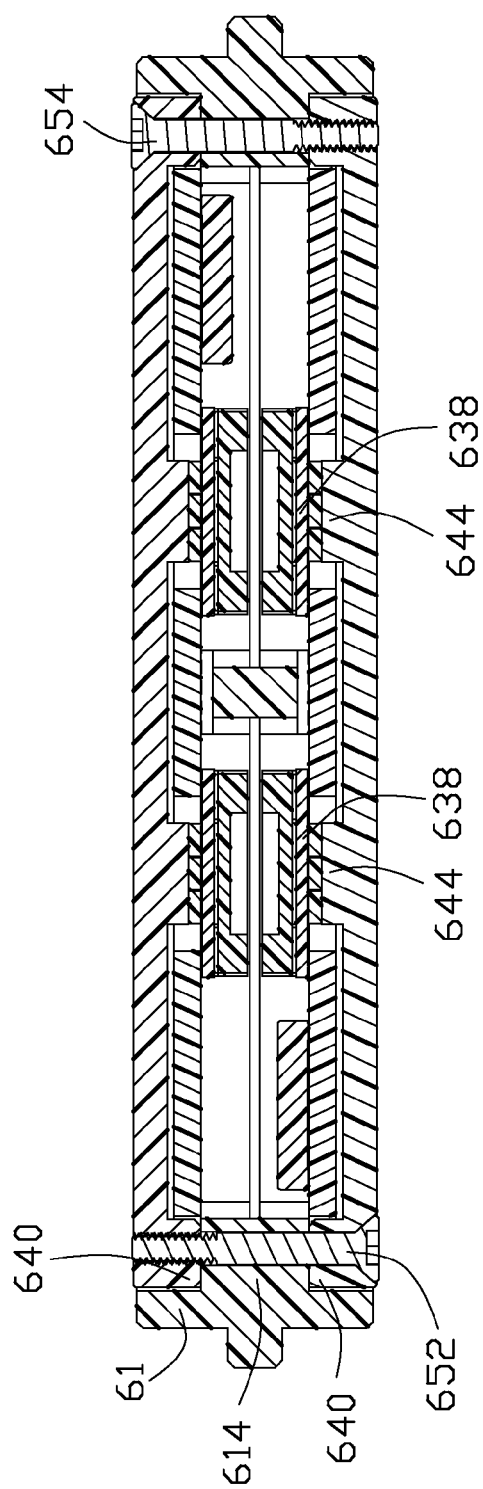
FIG. 23 is a cross section view of the AOC module of FIG. 20 taken alone the line 23-23.

The pair of heat conducting covers 64 are screwed to each other with the board holder 61 and the two SLC boards 63 sandwiched therebetween in a transverse direction perpendicular to the SLC boards 63. The heat conducting covers 64 have horizontal top walls 642 extending toward each other and overlapped with each other in the vertical direction. A first one of the two heat conducting covers 64 defines a first slope 646 guiding the second one downwardly and a second slope 648 guiding the second one upwardly when the two heat conducting covers 64 are transversely approaching to each other. The two heat conducting covers 64 could also be hinged to each other, which is shown in FIG. 16. Each of the two heat conducting covers 64 forms two protrusions 644 and two standoffs 640. The two protrusions 644 of each heat conducting covers 64 extend into two through holes 630 defined in a corresponding SLC boards 63 around which high power components 638 (shown in FIG. 22) are mounted. The standoffs 640 of the heat conducting covers 64 extending through concaves 634 defined in corresponding SLC PCB 63 and are supported by the inner walls 614 of the board holder 61. A threaded bolt 652 extends through a through hole 643 defined in one standoffs 640 of the first heat conducting covers 64 and a through hole 619 defined in one inner walls 614 of the board holder 61 and then is screwed into a threaded hole 641 defined in one standoffs 640 of the second heat conducting cover 64. A second threaded bolt 652 extends through a through hole 643 defined in the other standoffs 640 of the second heat conducting covers 64 and a through hole 619 defined in the other inner walls 614 of the board holder 61 and then is screwed into a threaded hole 641 defined in the other standoffs 640 of the first heat conducting cover 64.

The optical cable assembly 66 has four sets of optical cables 660, a strain-relief cable holder 662 holding the four sets of optical cables 660 and four molded lens mechanism 68 each positioning and coupling one set of optical cables 660 to one of the OE glass lenses of the two AOC assemblies 62. The strain-relief cable holder 662 is secured in a slot 618 defined in one of the end walls 612 of the board holder 662.

When assembled, for each SLC module 60, the optical cable assembly 66 is assembled to the two corresponding SLC boards 63. The SLC boards 63 is inserted into the corresponding card received slots 40 at the bottom after assembled to the heat conducting covers 64 and the board holder 63 via mounting screws 652, 654. The board holder 63 is assembled to the organizer 20 via engagement between the bumping blocks 616 of the board holder 63 and guide channels 34 of the organizer 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An AOC assembly comprising:
at least one PC (Printed Circuit) board each equipped with plural high power components and having a lower edge extending in a longitudinal direction with circuit pads on opposite sides thereof;
two heat conducting covers oppositely fixed in a transverse direction perpendicular to the at least one PC boards;
a board holder having two opposite vertical datum faces, said at least one PC board positioned on the two opposite vertical datum faces and jointly with the board holder received in the two heat conducting covers with the at least one lower edge extending downwardly therefrom, said two heat conducting covers oppositely fixed to said board holder in a transverse direction perpendicular to the at least one PC board; and
a connector defining two longitudinal slots receiving the at least one lower edge of the at least one PC board and an organizer defining a cavity receiving the connector; wherein
the heat conducting cover has integrated heat spreader for dissipating heat from the high power components on the at least one PC board.

2. The AOC assembly as claimed in claim 1, wherein the two heat conducting covers have horizontal top walls overlapped with each other in a vertical direction when the heat conducting covers are assembled toward each other in the transverse direction.

3. The AOC assembly as claimed in claim 1, wherein the at least one PC board comprises two PC boards, and the board holder has two inner walls disposed at two longitudinally opposite ends thereof and sandwiched between the two PC boards, each of the two inner walls having opposite vertical surfaces to define the vertical datum faces.

4. The AOC assembly as claimed in claim 3, wherein the board holder has an intermediate protrusion having opposite surfaces to commonly define the vertical datum faces.

5. The AOC assembly as claimed in claim 4, wherein the board holder has a bottom wall extending longitudinally and respectively connecting two inner walls and the intermediate protrusion.

6. The AOC assembly as claimed in claim 5, wherein the board holder further has two vertically extending end walls each having a lower end connected with longitudinally opposite ends of the bottom wall, the two inner walls extending toward each other in the longitudinal direction from an inner side of corresponding end walls.

7. The AOC assembly as claimed in claim 6, wherein one of the end walls defines a slot which receives a strain relief member fixing a plurality of optical cables.

8. The AOC assembly as claimed in claim 5, wherein the intermediate protrusion has two cutaways so that the datum faces are spaced away from high speed traces of the PC boards.

9. The AOC assembly as claimed in claim 1, wherein the two heat conducting covers form two standoffs aligned in the transverse direction and both abutting against the board holder, the pair of heat conducting covers screwed through the two standoffs of the heat conducting covers.

10. The AOC assembly as claimed in claim 1, wherein the two heat conducting covers have horizontal top walls hinged in such condition that the two heat conducting covers are selectedly in an open position where the heat conducting covers are removable and in a close position where the heat conducting covers are screwed to each other.

11. The AOC assembly as claimed in claim 1, wherein the at least one PC board defines a through hole, a surface on which plural high power components are mounted around the through hole, and an opposite surface facing one of the heat conducting covers which forms a protrusion extending into the through hole and approaching said high power components for heat spreading.

12. An AOC assembly comprising: a horizontal substrate defining a top surface; a receptacle mounted on the top surface of the substrate and having a pair of upwardly opening slots extending in a longitudinal direction and juxtaposed in a transverse direction, the receptacle having a plurality of contacts arrayed besides opposite sides of the pair of upwardly opening slots; and an AOC comprising: a pair of vertical PC boards each equipped with a plurality of OE components for electro-optical conversion and photoelectric conversion and having a lower edge to be inserted into corresponding upwardly opening slots, the lower edge having a plurality of circuit pads on opposite sides thereof for making electrical connection with the substrate through the contacts of the receptacle when the lower edge of the PC board is inserted into corresponding slot of the receptacle; a pair of heat conducting covers receiving and fixing the pair of PC boards therein with the lower edge extending downwardly therefrom; and an optical cable assembly having a plurality of optical waveguides and a plurality of lens mechanisms each coupling with corresponding OE components of the PC boards.

13. The AOC assembly as claimed in claim 12, wherein the AOC further comprises a board holder having two opposite vertical datum faces with the pair of PC boards respectively positioned thereon, the pair of heat conducting covers oppositely fixed to each other with the board holder and the two PC boards sandwiched therebetween.

14. The AOC assembly as claimed in claim 13, wherein each of the lens mechanisms has a plurality of optical lenses each aligned with one of the plurality of optical waveguides in the vertical direction and the plurality of optical waveguides fixed by the heat conducting covers to extend in the longitudinal direction outside the heat conducting covers.

15. An AOC assembly comprising: a pair of printed circuit boards spaced from each other in a transverse direction and extending along a longitudinal direction perpendicular to said transverse direction; each of said printed circuit boards being equipped with a plurality of circuit pads around a bottom edge region thereof for reception within an electrical connector, at least one lens mechanism mounted upon an inner surface of the printed circuit board and facing toward another inner surface of the other printed circuit board; a pair of optical cables coupled to the corresponding lens mechanisms, respectively, said pair of optical cables extending initially between said pair of printed circuit boards and successively out of said pair of printed circuit boards in the longitudinal direction for external connection; and a set of heat conductive cover shielding upper portions of said pair of printed circuit boards while exposing the bottom edge regions of said pair of printed circuit boards for reception within the electrical connector.

16. The AOC assembly as claimed in claim 15, wherein said set of heat conductive cover further covers said pair of optical cables between said pair of printed circuit boards.

17. The AOC assembly as claimed in claim 16, wherein each of said optical cables spans in said transverse direction.

18. The AOC assembly as claimed in claim 17, wherein said pair of optical cables are arranged in a stacked manner in a vertical direction perpendicular to both said transverse direction and said longitudinal direction.

* * * * *